United States Patent
Choiniere (10) Patent No.: US 11,215,454 B2
(45) Date of Patent: Jan. 4, 2022

(54) APPARATUS AND METHOD FOR UP FINDING

(71) Applicant: BAE SYSTEMS Information and Electronic Systems Integration Inc., Nashua, NH (US)

(72) Inventor: Michael J. Choiniere, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 463 days.

(21) Appl. No.: 16/375,169

(22) Filed: Apr. 4, 2019

(65) Prior Publication Data

US 2020/0318967 A1  Oct. 8, 2020

(51) Int. Cl.
 *G01C 19/36* (2006.01)
 *G01S 1/04* (2006.01)
 *F41G 7/22* (2006.01)
 *F41G 7/00* (2006.01)

(52) U.S. Cl.
 CPC .......... *G01C 19/36* (2013.01); *F41G 7/2246* (2013.01); *F41G 7/2293* (2013.01); *G01S 1/045* (2013.01)

(58) Field of Classification Search
 CPC . F41G 77/28; F41G 7/34; F41G 7/346; G01S 1/44
 See application file for complete search history.

(56) References Cited

U.S. PATENT DOCUMENTS

| | | | | |
|---|---|---|---|---|
| 6,724,341 B1* | 4/2004 | Pereira | ...................... | F41G 7/34 244/3.1 |
| 7,193,556 B1* | 3/2007 | Pereira | ...................... | F41G 7/34 244/3.1 |
| 7,977,613 B2* | 7/2011 | Rastegar | ................. | F41G 7/305 244/3.1 |
| 8,076,621 B2* | 12/2011 | Rastegar | ................. | F41G 7/305 244/3.1 |
| 8,093,539 B2* | 1/2012 | Rastegar | ................... | F41G 7/28 244/3.19 |
| 8,164,745 B2* | 4/2012 | Rastegar | ................... | F41G 7/34 356/138 |
| 8,258,999 B2* | 9/2012 | Rastegar | ................. | F41G 7/305 342/62 |
| 8,446,577 B2* | 5/2013 | Rastegar | ................... | G01S 1/44 356/138 |

(Continued)

*Primary Examiner* — Bernarr E Gregory
(74) *Attorney, Agent, or Firm* — KPIP Law, PLLC (57) ABSTRACT

A system for finding up in a projectile flight relative to earth. The system having a transmitter which transmits polarized reference signals to a guidance sub-system on the projectile. The guidance sub-system includes a magnetometer and polarized and non-polarized receivers. Measurements from the magnetometer are used to determine a general up direction. The polarized and non-polarized receivers are arranged such that, during rotation of the projectile, reference signals received by the polarized receiver modulate whereas reference signals received by the non-polarized receivers are unaffected. A ratio of the strengths of the signals received by the polarized and non-polarized receivers determines alignment of a vertical axis. From the general up direction and alignment of the vertical axis, a precise up direction of the projectile in flight relative to the earth can be determined.

17 Claims, 3 Drawing Sheets

(56) References Cited

U.S. PATENT DOCUMENTS

| | | | | |
|---|---|---|---|---|
| 8,514,383 B2* | 8/2013 | Rastegar | ............... | F41G 7/222 |
| | | | | 356/138 |
| 8,637,798 B2* | 1/2014 | Rastegar | ............... | F41G 7/346 |
| | | | | 244/3.1 |

* cited by examiner

APPARATUS AND METHOD FOR UP FINDING

FIELD OF THE DISCLOSURE

The present disclosure relates to an apparatus and method for up finding in projectile flight and more particularly to an apparatus and method for up finding with a polarized communication link and magnetometer.

BACKGROUND OF THE DISCLOSURE

Guidance control systems are known for guiding or controlling projectiles while in flight so as to alter their trajectory. Such guidance control systems are incorporated having flight control surfaces, e.g., guidance canards, fins, strikes and rudders that can be adjusted to change their communication with the airstream and alter the trajectory of the projectile. These flight control surfaces are adjusted by actuators which receive guidance commands from the guidance control system. Typical guidance control systems can include a number of guidance sub-systems including sensing and measuring means, communication means, computing means and a power source which together can function to determine whether or not changes of the projectile trajectory are necessary or desired and to transmit control commands to the flight control surfaces in order to implement those changes. In these determinations it is often required to ascertain the attitude of the projectile, i.e., the orientation of the projectile relative to some fixed reference. This can be accomplished by "up-finding" or rather finding the up direction relative to a horizon line or rather the surface of the earth. Generally the earth's gravitational force makes up-finding relatively simple. However, in relation to projectiles, especially spinning projectiles, the influence of other forces acting on the projectile can complicate the up-finding process. For example, up-finding for projectile in ballistic flight can be difficult due to the fact that the projectile flight path. For example, in some cases the projectile can be in free-fall for some portion of its flight. In certain cases, accelerometers, which are often used in projectile guidance sub-systems, are unable to determine the direction of gravity. Inertial Measurement Units (IMUs) can also be utilized for up-finding in projectile guidance sub-systems that require knowing the up direction; however such IMUs can be expensive and are generally not practical for use in a projectile that spins in flight.

Wherefore it is an object of the present disclosure to overcome the above-mentioned shortcomings and drawbacks associated with the conventional means of up-finding for a munition in ballistic flight.

SUMMARY OF THE DISCLOSURE

One aspect of the present disclosure is guidance control system having a magnetometer and either a polarized Radio Frequency (RF) or polarized Electro Optic (EO) communications link that are utilized for up finding. In one embodiment, the magnetometer is used for determining up to within +/−20 to 40 degrees and a polarized EO communications link is used to determine orientation relative to a horizontal or vertical polarized reference, for example, to within 2 to 3%. Orientation relative to the polarized reference can be determined by means of two EO sensors, i.e., one polarized and one non-polarized. Each one of the two EO sensors receives polarized signals of the EO communications link at varying strengths depending on the orientation of the EO sensors. Ratios of the polarized signals received by the two EO sensors are then utilized to determine the rotational orientation of the two EO sensors relative to the polarized reference.

In another embodiment of the present disclosure a system comprises a magnetometer and a polarized RF communications link. The system can use the magnetometer to determine up to within +/−20 to 40 degrees and the polarized RF communications link is used to determine orientation relative to a horizontal or vertical polarized reference, for example, to within 2 to 3%. Orientation relative to the polarized reference can be determined by means of two RF antennas, one polarized and one non-polarized. Each one of the two RF antennas receives the signals at varying strengths depending on the orientation of the RF antennas. Ratios of the polarized signals received by the RF antennas are then used to determine the rotational orientation of the two RF antennas relative to the polarized reference.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

Figure 1:
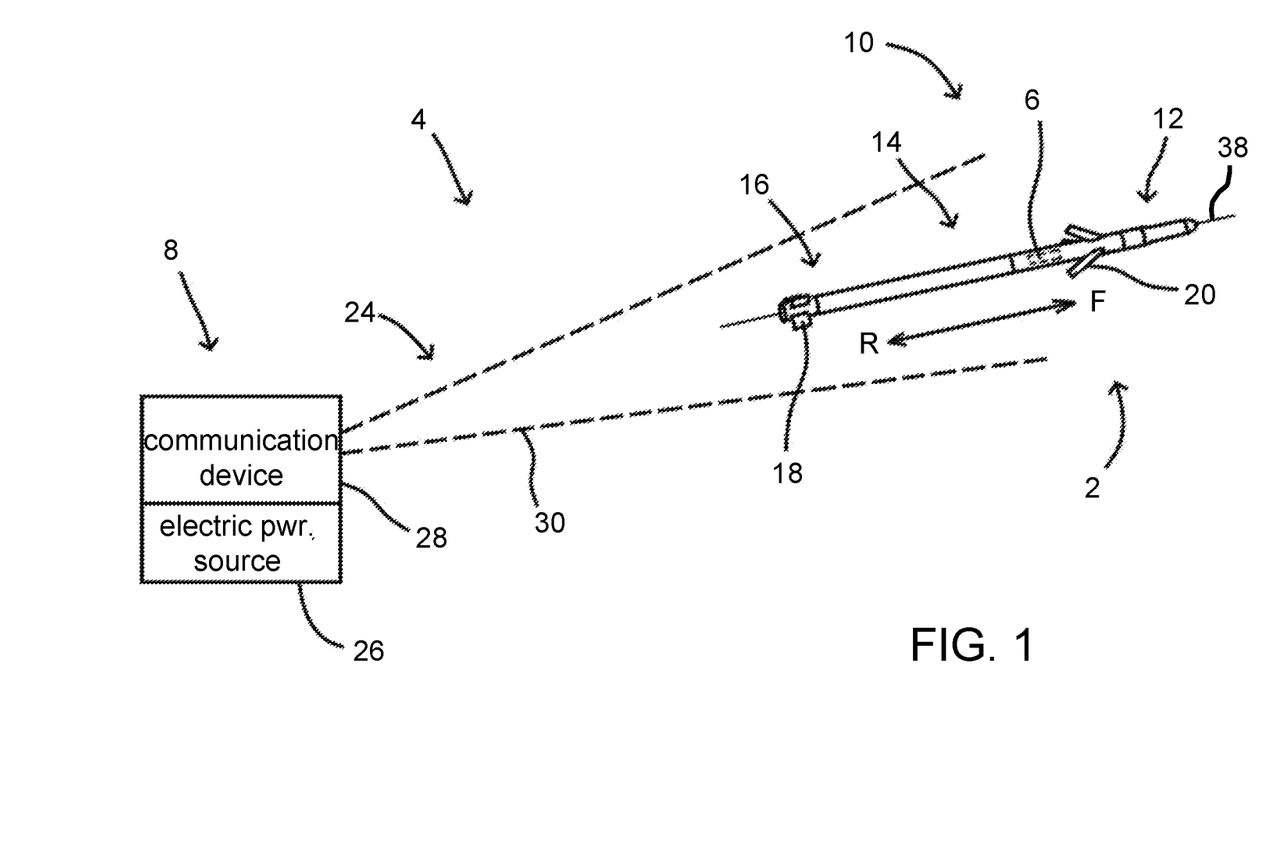
FIG. 1 is a diagrammatic illustration of a munition in ballistic flight having a guidance system according to the disclosure.
Figure 2:
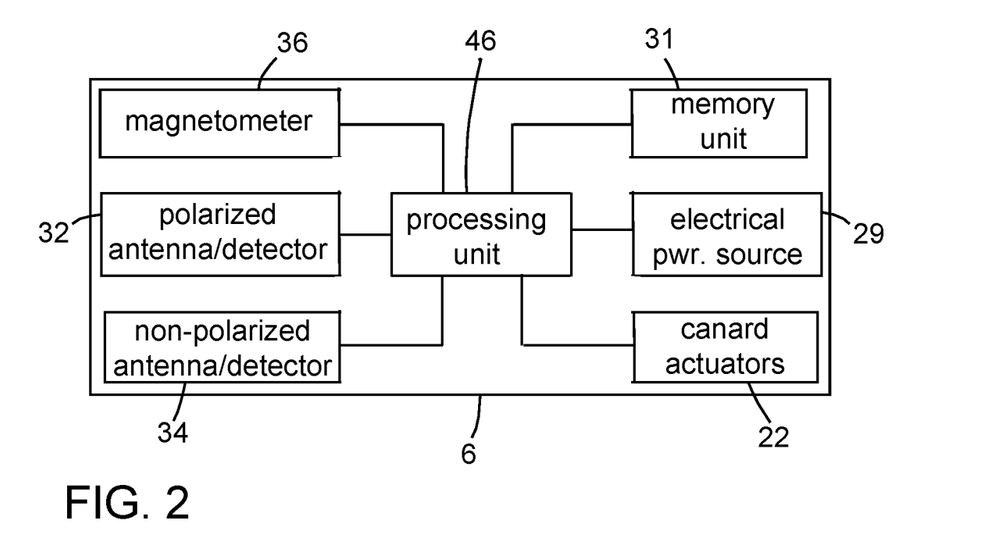
FIG. 2 is a diagrammatic illustration of an onboard guidance sub-system according to the disclosure.

FIGS. 1 and 2 diagrammatically illustrate an embodiment having a guided projectile 2 and a guidance control system 4 that includes an onboard guidance sub-system 6 mounted on the projectile 2, and a remote fire control system 8. The term projectile as used herein should be understood as being a missile, round, bullet or rocket. Preferably the projectile is gun-fired and follows a trajectory that is determined by ballistics although can include flight control systems. Projectiles according to one example generally range in size from 30 to 155 mm and are fired, shot or launched from ordnance. The projectile 2 comprises a body 10 having a front portion 12, a central portion 14, and a rear portion 16. The front portion 12 of the body 10 is generally tapered so as to minimize the effects of air resistance on the projectile 2 during flight. Secured to the rear portion 16 of the body 10 are a number of strikes 18 which extend into and communicate with the airstream along the projectile 2 and help to stabilize the projectile 2 during flight. Flight control surfaces such as guidance canards 20 are adjustably mounted on the central portion 14 of the body 10 preferably toward the front portion 12 of the body 10. Actuators 22 can be activated to adjust the alignment of the guidance canards (flight control surfaces) 20 in the airstream relative to the projectile 2 and thereby alter the flight path of the projectile 2. The actuators 22 can be controlled by means of the onboard guidance sub-system 6 based on a polarized communications link 24 transmitted from the fire control system 8. To properly control and adjust the guidance canards (flight control surfaces) 20, it is necessary for the guidance control system 4 to determine the attitude of the projectile 2. The term attitude as used herein is defined as the position of a projectile determined by the relationship between its axes and a reference such as a horizontal and/or vertical reference for example. In guiding the projectile 2, alignment of the guidance canards (flight control surfaces) 20 is adjusted by means of navigation commands received by the actuators 22. To simplify control of the guidance canards (flight control surfaces) 20 it is beneficial to decouple or rather divide the navigation commands into elevation and azimuth commands. When decoupling elevation and azimuth commands from each other, it is essential to accurately find up or rather determine the up direction relative to the earth.

The fire control system 8 is remote from the projectile 2 and facilitates firing and directing the projectile 2 to a target. The fire control system 8 includes an electrical power source 26 and at least an RF or EO communication device 28 which generates the polarized communications link 24. The polarized communications link 24 is comprised of polarized RF or EO signals 30 that are transmitted to the projectile 2.

The RF/EO communication device 28 can generate a simple pulse beacon to inform the onboard guidance sub-system 6 of or enable the onboard guidance sub-system 6 to determine the up and down orientation. The communications link 24 can be generated to provide the onboard guidance sub-system 6 with command guidance information ranging from midcourse correction commands, which implement corrections to the trajectory of the projectile 2, to a full command guidance loop so as to direct the projectile 2 to the impact point, i.e., target. The RF/EO communication device 28 and communications link 24 can be utilized in any method of communicating with the projectile 2 or rather the receiver of the onboard guidance sub-system 6, thereby eliminating the need for an IMU if using a high bandwidth (50 to 100 Hz) communication line to a low value IMU coupled with a simple periodic update (1 to 10 Hz).

When considering application of the guidance control system 4, it is recognized that each signal type RF or EO generated by the RF/EO communication device 28 offers advantages. Depending on the range or distance between the fire control system 8 and the onboard guidance sub-system 6 over the course of its trajectory, systems including an EO communication device 28 that transmit laser power can be costly, however the corresponding EO onboard guidance sub-system 6 offers low cost, smaller sized components, e.g., EO sensors and optics to be mounted on the projectile 2 relatively inexpensive. In contrast, the expense of the RF onboard guidance sub-system 6 mounted on the projectile 2 is greater. Further, the type of communication device 28 utilized with the guidance control system 4, i.e., either an RF communication device or EO communication device can depend on environmental and/or topographical conditions in which the guided projectile 2 and the guidance control system 4 are to operate. For example, in rainy conditions or conditions in which visibility between the fire control system 8 and the onboard guidance sub-system 6 is obscured, this reduced visibility can severely impact EO sensor performance and negatively affect communications by way of EO communication devices 28, whereas communicating via an RF communication device 28 and corresponding RF onboard guidance sub-system 6 are less susceptible to inclement weather and poor visibility.

It is to be appreciated that the polarization orientation of the polarized communications link 24 can be either horizontal or vertical. However, the guidance control system 4 should be designed considering the impact of multipath interference depending on the flight profile of the projectile 2 and onboard guidance sub-system 6. As the projectile 2 and onboard guidance sub-system 6 approaches the ground, the earth's vertical polarization tends to mitigate multipath interference over horizontal polarization signals.

The fire control system 8 can further include: a target acquisition device; a processing device for determining a projected trajectory from the ordnance to the target based on acquired target location information; a data interface, i.e., the RF/EO communication device 28 for communicating target and trajectory information via polarized RF/EO signals 30 from the fire control system 8 to the onboard guidance sub-system 6 mounted on the projectile 2. As a function of the target and trajectory information 30, the onboard guidance sub-system 6 can issue flight control commands and implement initial flight control sequences to at least initially direct the projectile 2 to the target. It is to be appreciated that the fire control system 8 can comprise additional devices, components or systems such as a range finder, a tracking system, a location determining device and a data input device, for example. As these additional devices are known in the art of fire control systems, a detailed description of the same is not believed to be necessary.

As diagrammatically shown in FIG. 2, the onboard guidance sub-system 6 mounted in the projectile 2 includes two RF antennas or EO detectors 32, 34 and a magnetometer 36 which are utilized together for up-finding or rather determining the up direction of the projectile 20 relative to the surface of the earth. The magnetometer 36 measures the strength and/or direction of the earth's magnetic field. One of the two RF antennas or EO detectors 32 is polarized while the other one of the two RF antennas or EO detectors 34 is non-polarized (circular polarized). The measurements of the magnetometer 36 alone can determine the up direction, relative to the surface of the earth, however this determination is generally fairly rough, e.g., to within 10 to 20 degrees of a vertical axis. From the strengths of the signals received by the two RF antennas or EO detectors 32, 34, an axis in the up and down directions can be accurately determined, e.g., to within 2 to 3%, however the determination of which direction is up, is not possible.

Figure 3:
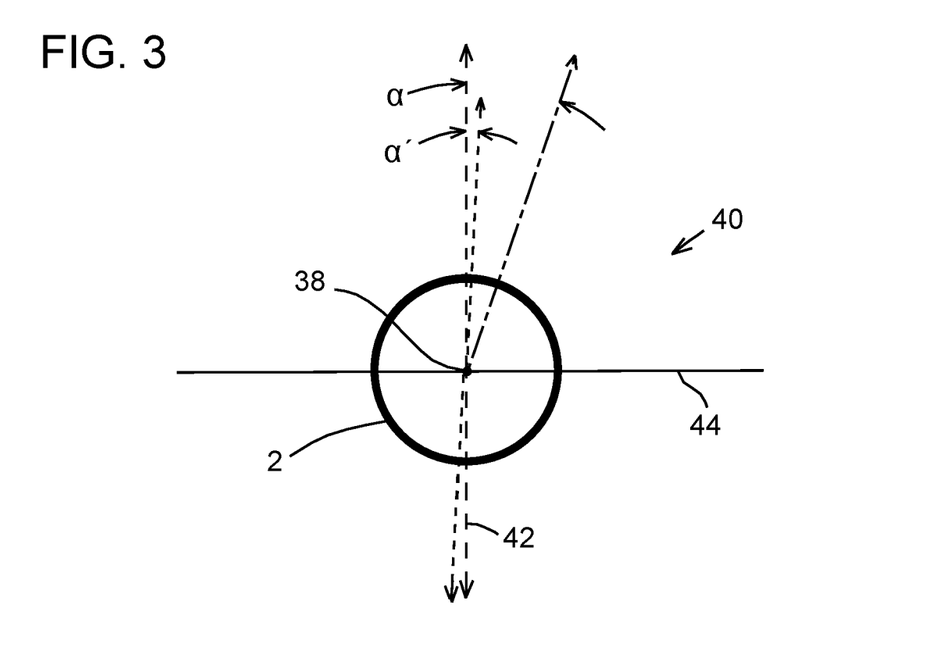
FIG. 3 is a diagrammatic illustration of the munition in ballistic flight and corresponding coordinate axes thereof.

FIG. 3 shows an axial cross sectional view of one embodiment of a projectile 2 on which the onboard guidance sub-system 6 is mounted. The body 10 of the projectile 2 is diagrammatically illustrated as a closed curve shape with a longitudinal axis 38 of the projectile 2 being a central point within the generally circular body 10. The figure shows the projectile 2 from a rear perspective in which the forward direction of travel F of the projectile 2 is straight into the plane of the drawing. FIG. 3 further illustrates a two dimensional polar grid 40 that is representative of a plane arranged perpendicular to the longitudinal axis 38 of the projectile 2 in the direction of flight F. The polar grid 40 includes actual vertical and horizontal axes 42, 44 that intersect at an origin which corresponds to the longitudinal axis 38 of the projectile 2. The actual horizontal axis 44 of the polar grid 40 represents a level on the surface of the earth and the actual vertical axis 42 is perpendicular to the actual horizontal axis 44 and corresponds to an actual up direction and an actual down direction relative to the surface of the earth. During flight of the projectile 2, changes in the forward direction of flight F relative to the actual vertical axis 42 can be considered as changes in the elevation of the projectile 2 or simply changes in the up and down directions. Similarly, changes in the forward direction of flight F relative to the actual horizontal axis 44 can be considered as changes in the azimuth of the projectile 2 or simply changes in the right and left directions. The polar grid 40 shown in FIG. 3 illustrates a 20 degree uncertainty α in finding up, i.e., a rough up direction. This amount of uncertainty in finding up contaminates or cross couples the elevation and azimuth commands by approximately 33% such that if, for example, it is determined that the azimuth of the projectile 2 needs to be adjusted to the right by a given amount, the elevation commands for adjusting the projectile 2 either up or down will by contaminated by 33% of the given amount. Because of this, guidance of the projectile 2 using elevation and azimuth commands can be complicated. To overcome the drawback associated with the rough determination of up or rather the uncertainty α in finding up with the magnetometer 36, the two RF antennas or EO detectors 32, 34 are utilized to more accurately determine up and thereby provide a reduced uncertainty α' in up-finding.

Figure 4:
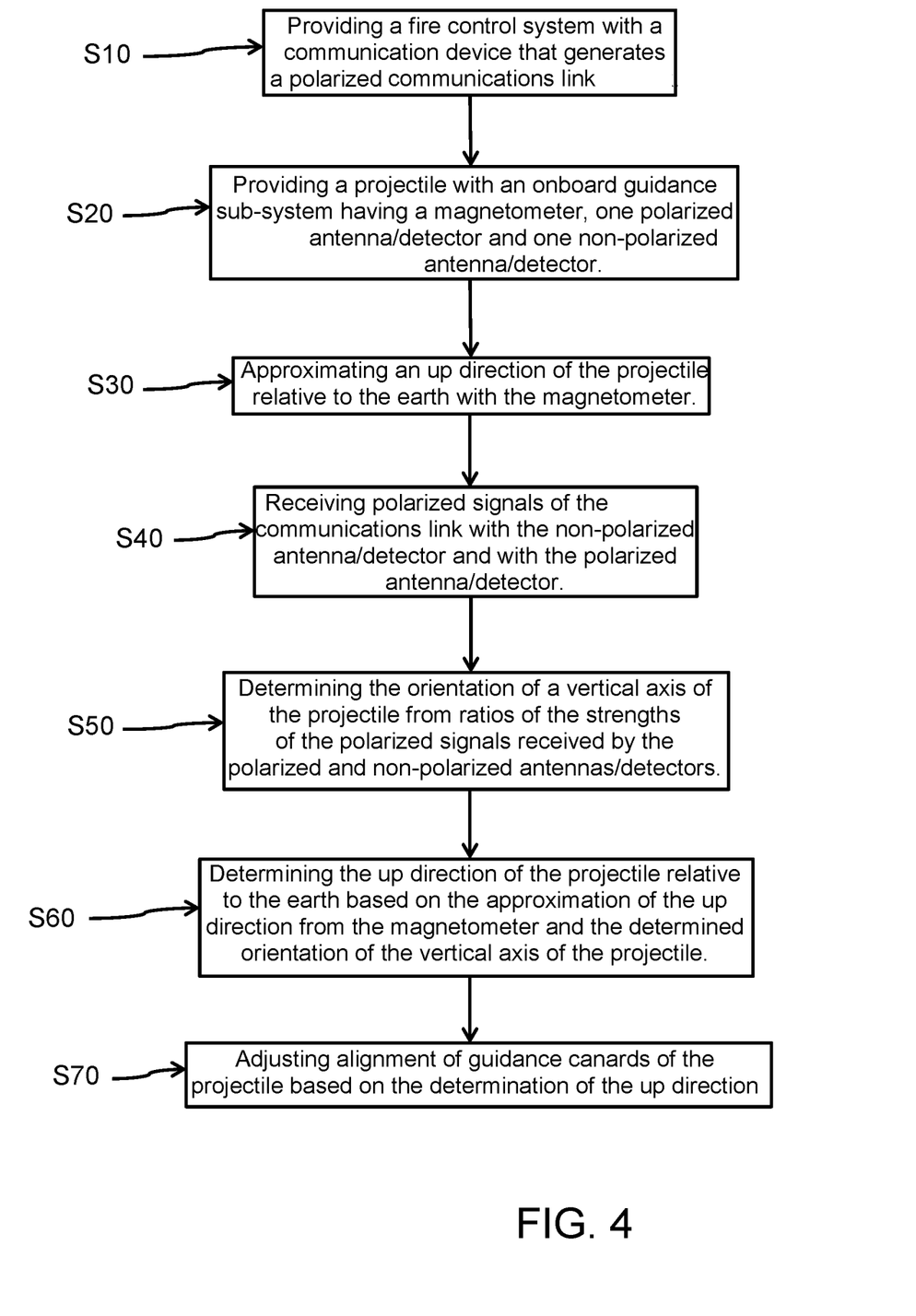
FIG. 4 is a flow chart illustrating a method of up finding in a ballistic munition flight.

A method of up-finding for a projectile in ballistic flight with the guidance control system 4 according to the disclosure will now be described with reference to the flow chart of FIG. 4. Initially, the fire control system 8 is provided S10 with an RF/EO communication device 28 that generates a polarized communications link 24 that is made up of either polarized RF or polarized EO reference signals 30. Preferably the RF/EO communication device 28 is arranged in the fire control system 8 such that the polarization of the polarized signals is known, for example the polarized signals can be vertically polarized. Also, the projectile 2 is provided S20 with an onboard guidance sub-system 6 that includes a magnetometer 36 and the two RF antennas or two EO detectors, one being polarized and one being non-polarized. The two antennas/detectors 32, 34 can be positioned on the projectile 2 directed in the rearward direction of travel R so as to be facing the polarized RF/EO signals 30 transmitted toward the projectile 2 from the fire control system 8 by the RF/EO communication device 28. The onboard guidance sub-system 6 further includes an electrical energy source 29 that can electrically power a processing unit 46 so as to analyze the received polarized RF/EO signals 30 according to process steps stored on computer readable medium 31. The components of the onboard guidance sub-system 6 communicate with the processing unit 46 thereby enabling the determination of up with a reduced uncertainty α' and issuance of elevation and azimuth command signals for correcting guidance of the projectile 2 while in flight if necessary.

As described herein the magnetometer 36 measures the direction and/or strength of the earth's magnetic field and these measurements are used by the processing unit 46 to roughly determine or rather approximate S30 the up direction relative to the earth to within 10 to 20 degrees of a reference vertical axis aligned in the actual up direction, which is defined as being a direction extending directly away from the surface of the earth or, rather, extending away from the earth and perpendicular to the actual horizontal axis of the earth.

The non-polarized antenna/detector (circular polarized) 34 receives or detects S40 the polarized RF/EO signals 30 of the polarized communications link 24. The amplitude of the received or detected RF/EO signals 30 is not impacted by the rotational orientation of the projectile 2, meaning the amplitude of the received or detected RF/EO signals 30 is substantially constant during rotation of the projectile 2 and thus the non-polarized antenna/detector 34 functions as a reference to the system. As all RF and EO signals will vary from pulse to pulse due to such things as weather, path length, multipath and in the case of EO signals, scintillation, by measuring the amplitude of the received RF/EO signals 30, which are not affected by polarization, a reference signal can be measured.

The other antenna/detector 32 is polarized in contrast to the non-polarized antenna/detector (circular polarized) 34. The polarized antenna/detector 32 receives or detects S40 the polarized RF/EO signals 30 which, unlike the reference signal of the non-polarized antenna/detector 34, modulate (sine wave) as the projectile 2 rotates. That is to say in other words, the amplitude of the polarized RF/EO signals 30 received by the polarized antenna/detector 32 modulate as the projectile 2 rotates. As described below in more detail, the ratio between the amplitude of the modulating RF/EO signal and the amplitude of the reference signal provides rotational orientation to within <2%.

The amplitudes of the polarized RF/EO signals 30 received or detected the antennas/detectors 32, 34 are converted into corresponding digital signals. The two antennas/detectors 32, 34 are arranged with respect to each other such that the signal level of the digital signals from the polarized antenna/detector 32 varies or rather modulates in relation to the digital signals from the non-polarized antenna/detector 34, which relate to the reference signals, based on the rotational position of the projectile 2 with respect to the RF/EO communication device 28. The digital signals are transmitted from the two antennas/detectors 32, 34 to the processing unit 46 for analysis. The processing unit 46 analyzes ratios of the signal levels from the polarized and non-polarized antenna/detector 32, 34 to determine the roll orientation of the projectile 2 relative to the polarized RF/EO signals 30. That is to say, ratios of the signal levels from the two antennas/detectors 32, 34 are utilized, in the manner more fully described below, by the processing unit 46 to determine the alignment of an axis extending in the up and down directions. When the ratio of the levels of the signals is 1:1 or equivalent, the projectile 2 is aligned to the polarized signal. For example, using a vertically polarized reference signal relative to the earth, when the ratio is 1:1, the weapon is aligned to the actual vertical reference, i.e., aligned with the actual vertical axis extending in the up and down directions. Up or down would then be determined by the magnetometer 36 to remove the up or down ambiguity. If the ratio is 1:50, the projectile 2 is now within 2% of the orthogonal axis. The ratio can be a factor calibration or simply an in-flight calibration of a few roll events to measure the sinusoid.

During analyses of the ratios of signal levels from the two antennas/detectors 32, 34, the processing unit 46 identifies two high ratio values and two low ratio values per 360 degrees of revolution of the projectile 2. The high and low ratio values of the signal levels generally define the vertical and horizontal axes 42, 44 of the polar grid 40. From the high and low ratio values, the processing unit 46 determines S50 the orientation of the vertical axis 42 to within 1 to 2 degrees of the actual vertical reference relative to the earth, i.e., to within 2 to 3% of actual vertical axis relative to the earth. Since the sine wave ratio varies by 180 degrees or one half a rotation, the polarization cannot determine which direction along the vertical axis is up and which direction is down. From the rough determination of the up direction by means of the magnetometer 36 and the determination of the vertical axis orientation by means of the two antennas/detectors 32, 34, the processing unit 46 accurately determines S60 the up direction. By coupling the function of a crude magnetometer 36, which can determine up or down to within +/−40% uncalibrated, with the orientation of the vertical axis, as determined based on signals from the two antennas/detectors 32, 34, the guidance control system 4 can use the accuracy of the polarizer (accurate to within 2%) while the magnetometer 36 removes the 180 degree ambiguity.

To determine up, the magnetometer 36 is used in combination with the two antennas/detectors 32, 34. Although the two antennas/detectors 32, 34 determine the orientation of the vertical axis 42 accurately, there is a large degree of ambiguity in determining the up direction. The magnetometer 36 functions to remove the up and down ambiguity of the two antennas/detectors 32, 34. As described above, the uncertainty α in up finding by means of the magnetometer 36, which contaminates or cross-couples the elevation and azimuth navigation commands by about 33%, is mitigated by the accuracy of determining up and down by means of the two antennas/detectors 32, 34. By utilizing two antennas/detectors 32, 34 in combination with the magnetometer 36, contamination or cross-coupling of the elevation and azimuth navigation commands is reduced to only 3 to 4%.

Based on the precise determination of the up direction as described above, the processing unit 46 transmits elevation and azimuth commands to the actuators 22 to adjust S70 alignment of the guidance canards (flight control surfaces) 20 in the airstream relative to the projectile 2 and thereby alter or make corrections to the flight path of the projectile 2.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A system for up finding in a projectile flight, the system comprising:
   a communication transmitter which transmits polarized reference signals to a remote projectile;
   a guidance sub-system being mounted on the projectile, the guidance sub-system having a magnetometer and at least two communication receivers, one of the communication receivers being a polarized communication receiver and the other being a non-polarized communication receiver;
   the magnetometer measuring a magnetic field of earth and transmitting magnetic field measurement signals to a processing unit of the guidance sub-system;
   the non-polarized communication receiver being arranged to receive the polarized reference signals and configured to detect an amplitude of the polarized reference signals, the detected amplitude of the polarized reference signals being substantially unaffected by rotation of the projectile;
   the polarized communication receiver being arranged to receive the polarized reference signals and configured to detect the amplitude of the polarized reference signals received thereby, the detected amplitude of the polarized reference signals received by the polarized communication receiver is a modulated signal based on rotation of the projectile;

the polarized and the non-polarized communication receivers transmitting the detected amplitudes of the polarized reference signals to the processing unit;

the processing unit comprising at least one processor for determining a rough up direction of the projectile flight relative to earth based on the magnetic field measurement signals transmitted from the magnetometer, and the processing unit determining alignment of a vertical axis of the projectile relative to the earth based on ratios of the detected amplitudes of the polarized reference signals received by the polarized and the non-polarized communication receivers, and the processing unit transmitting control signals to control actuators to adjust flight control surfaces of the projectile based at least on the rough up direction and the alignment of the vertical axis of the projectile.

2. The system for up finding according to claim 1, wherein either:

the communication transmitter is a radio frequency transmitter which transmits polarized radio frequency reference signals, and the polarized and the non-polarized communication receivers have radio frequency antennas that receive the radio frequency reference signals; or the communication transmitter is an electro-optic transmitter which transmits polarized electro-optic reference signals, and the polarized and the non-polarized communication receivers have electro-optic detectors that receive the electro-optic reference signals.

3. The system for up finding according to claim 1, wherein the polarized communication receiver and the non-polarized communication receiver are mounted on the projectile such that the polarized reference signals received by the non-polarized communication receiver have substantially constant amplitudes during rotation of the projectile, and the polarized reference signals received by the polarized communication receiver have amplitudes that modulate due to rotation of the projectile.

4. The system for up finding according to claim 1, wherein the control signals transmitted by the processing unit comprise elevation commands and azimuth commands, the control actuators are actuatable by the elevation commands and the azimuth commands, and the flight control surfaces are connected to the control actuators such that alignment of the flight control surfaces are adjustable based on the elevation and the azimuth commands.

5. The system for up finding according to claim 1, wherein the communication transmitter is a polarized transmitter which transmits either vertically or horizontally polarized reference signals to the polarized and the non-polarized communication receivers mounted on the projectile.

6. The system for up finding according to claim 1, wherein ratios of the detected amplitudes of the polarized reference signals received by the polarized and the non-polarized communication receivers determine a rotational position of the projectile relative to an orientation of the communication transmitter and the polarized reference signals transmitted therefrom.

7. The system for up finding according to claim 1, wherein the projectile is a gun fired projectile.

8. A method of up finding in a projectile in flight relative to earth, the method comprising:

generating a polarized communication link comprising polarized reference signals;

approximating, with a magnetometer, a rough up direction of the projectile relative to the earth which is within 20 to 40 degrees of an actual up direction relative to the earth, the actual up direction extending directly away from the earth;

receiving the polarized reference signals of the polarized communications link with a non-polarized communication receiver and a polarized communication receiver;

determining, with a processing unit, an alignment of a vertical reference axis of the projectile relative to the earth based on ratios of amplitudes of the polarized reference signals received by the non-polarized and the polarized communication receivers;

determining, with the processing unit, the actual up direction of the projectile relative to the earth based on the rough up direction approximated by the magnetometer and the determined alignment of the vertical axis of the projectile relative to the earth; and adjusting, with actuators, alignment of control surfaces of the projectile based on the determination of the actual up direction of the projectile relative to the earth.

9. The method according to claim 8, further comprising providing either:

a radio frequency transmitter as the communication transmitter which generates a polarized radio frequency communication link that is formed by polarized radio frequency reference signals, and antennas as the polarized and the non-polarized communication receivers that receive radio frequency reference signals; or an electro-optic transmitter as the communication transmitter which generates a polarized electro-optic communication link that is formed by polarized electro-optic reference signals, and detectors as the polarized and the non-polarized communication receivers that receive electro-optic reference signals.

10. The method according to claim 9, further comprising mounting the polarized communication receiver and the non-polarized communication receiver on the projectile such that the polarized reference signals received by the non-polarized communication receiver have substantially constant amplitudes during rotation of the projectile, and the polarized reference signals received by the polarized communication receiver have varying amplitudes during rotation of the projectile.

11. The method according to claim 9, further comprising:

measuring a magnetic field of the earth with the magnetometer and transmitting magnetic field measurement signals to the processing unit from the magnetometer;

transmitting amplitudes of the polarized reference signals received by the polarized and the non-polarized communication receivers to the processing unit; and determining, with the processing unit, alignment of the vertical axis of the projectile relative to the earth based on ratios of the amplitudes of the polarized reference signals received by the polarized and the non-polarized communication receivers.

12. The method according to claim 9, further comprising activating, with the processing unit, actuators that are connected to the control surfaces of the projectile to bias the control surfaces based on control commands that depend on the determination of the actual up direction of the projectile relative to the earth.

13. The method according to claim 12, further comprising decoupling, with the processing unit, the control commands into separate elevation and azimuth commands and transmitting the elevation and the azimuth commands to the actuators for adjusting the alignment of the control surfaces of the projectile.

14. The method according to claim 8, further comprising transmitting with the communication transmitter either vertically or horizontally polarized reference signals to the polarized and the non-polarized communication receivers mounted on the projectile.

15. The method according to claim 8, further comprising approximating the rough up direction of the projectile relative to the earth, with the magnetometer, to within 20 degrees of the actual up direction relative to the earth.

16. The method according to claim 15, further comprising determining, with the processing unit, the alignment of the vertical axis of the projectile relative to the vertical reference axis to within 2 to 3% based on the ratios of the amplitudes of the polarized reference signals received by the non-polarized and the polarized communication receivers.

17. The method according to claim 16, further comprising determining, with the processing unit, the up direction of the projectile relative to the earth to within 2 to 3% of the actual up direction relative to the earth.

* * * * *